(12) United States Patent
Öchsner et al.

(10) Patent No.: US 6,566,433 B1
(45) Date of Patent: May 20, 2003

(54) POWDER COMPOSITION FOR THE PRODUCTION OF AQUEOUS COATING AGENTS

(75) Inventors: Waldemar Philipp Öchsner, Ludwigsburg (DE); Herbert Weiss, Immenhausen (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/831,684

(22) PCT Filed: Nov. 5, 1999

(86) PCT No.: PCT/EP99/08505

§ 371 (c)(1),
(2), (4) Date: Jun. 29, 2001

(87) PCT Pub. No.: WO00/27919

PCT Pub. Date: May 18, 2000

(30) Foreign Application Priority Data

Nov. 10, 1998 (DE) .......................................... 198 61 030

(51) Int. Cl.[7] .................................................. C08K 5/05
(52) U.S. Cl. ...................... 524/387; 524/414; 524/416; 524/800
(58) Field of Search ................................ 524/387, 800, 524/414, 416

(56) References Cited

U.S. PATENT DOCUMENTS

| | | | |
|---|---|---|---|
| 3,562,197 A | | 2/1971 | Sears et al. |
| 3,645,675 A | | 2/1972 | Sears et al. |
| 3,723,074 A | | 3/1973 | Sears et al. |
| 4,210,725 A | * | 7/1980 | Redfarn ...................... 521/100 |
| 4,940,841 A | | 7/1990 | Dickerhof |
| 5,223,323 A | | 6/1993 | Dickerhof et al. |
| 5,374,691 A | | 12/1994 | Hintze-Bruning et al. |
| 5,387,655 A | * | 2/1995 | Aslin .......................... 525/511 |
| 5,401,793 A | * | 3/1995 | Kobayashi .................. 524/401 |
| 5,407,995 A | | 4/1995 | Hintze-Bruning et al. |
| 6,228,914 B1 | * | 5/2001 | Ford .......................... 524/124 |

FOREIGN PATENT DOCUMENTS

| | | |
|---|---|---|
| DE | 2704897 | 9/1979 |
| DE | 19731352 | 3/1998 |

* cited by examiner

Primary Examiner—Edward J. Cain
(74) Attorney, Agent, or Firm—Bart E. Lerman

(57) ABSTRACT

A powder composition for preparing aqueous coating agents, characterised in that it contains A) 15 to 30 wt. % of one or more melamine resins,
B) 3 to 30 wt. % of one or more polyhydric alcohols,
C) 10 to 50 wt. % of one or more phosphates and/or polyphosphates and
D) 3 to 40 wt. % of one or more chloroparaffins and/or melamine and/or melamine derivatives and/or dicyanodiamide.

12 Claims, No Drawings

POWDER COMPOSITION FOR THE PRODUCTION OF AQUEOUS COATING AGENTS

CROSS-REFERENCE TO PARENT APPLICATIONS

This application is a 35 U.S.C. §371 of PCT/EP99/08505 filed on Nov. 5, 1999, which claims benefit of German Application Ser. No. 198 61 030.0, filed Nov. 10, 1998.

The invention provides a powder composition which is suitable, as an aqueous dispersion, for coating metal, wood and plastics substrates, in particular also steel and concrete substrates.

A number of coating compositions which can be used as aqueous dispersions for coating the substrates mentioned above is known.

According to EP-A 384 506, an aqueous coating composition is used which contains 15 to 55 wt. % of melamine resin in addition to polyols and fillers and also optionally urea resins and a polyacrylate dispersion, wherein the individual components are blended with each other with stirring and water is added. A water-dilutable acid is used as hardening component. The coating agent is used to coat wood substrates, mainly for finish-films and continuous edges.

Similar compositions, which may also contain OH group-containing polyesters, are described, for example, in EP-A 541 635 and DE-A 40 01 672. According to EP-A 279 441, a melamine resin dispersed in an aqueous medium is e.g. a constituent of an aqueous coating composition, in amounts of 5 to 50 wt. %.

Substrates in the furniture and sheeting industry, including e.g. paper films, are substantially used as substrates.

The coating compositions mentioned are intended to provide resistance to water, specifically to moisture in internal rooms. In particular coatings for external use, however, may deteriorate under the effects of water and thus are not weather-resistant.

Other properties, such as stability under the effects of heat following application of the coating composition, in particular on wood substrates, but also on steel and concrete substrates, are not guaranteed.

Aqueous coating materials are conventionally prepared by slurrying or finely distributing the individual components in water. Stability problems or problems during processing of the aqueous coating materials may occur in the event of long storage times and/or in the event of large variations in ambient temperature during storage.

The object of the invention is, therefore, to find a coating composition which does not have stability or processing problems during long-term storage, in particular does not have frost-resistance problems, and which can be processed without great expense to give aqueous coating materials. In addition the coatings produced should have an increased resistance to the effects of moisture and also protect the substrates from rapid heating up and ignition under the effects of heat.

The object is achieved by a powder composition for preparing aqueous coating agents which contains A) 15 to 30 wt. % of one or more melamine resins,
B) 3 to 30 wt. % of one or more polyhydric alcohols,
C) 10 to 50 wt. % of one or more phosphates and/or polyphosphates and
D) 3 to 30 wt. % of one or more chloroparaffins and/or melamine and/or melamine derivatives and/or dicyanodiamide.

In addition, additional additives such as, for example, wetting agents, emulsifiers, thixotropic agents, coloured pigments, fillers and agents for controlling the reaction may be present.

One or more melamine resins is used as component A according to the invention, as binder. Melamine resins are condensation products such as are obtainable by known processes by reacting an aldehyde, in particular formaldehyde, with, for example, benzoguanamine or melamine. They may be entirely or partly etherified with alkanols which contain 1 to 6 carbon atoms. Melamine/formaldehyde reaction products are preferred. Hexamethoxymethylmelamine resins, for example the commercial products with the tradenames CYMEL 300, 301, 303, are particularly suitable.

The melamine resins are used in an amount of 15 to 30 wt. %, preferably more than 15 wt. %, particularly preferably 15 to 20 wt. %, in the powder composition according to the invention.

Water-insoluble polyhydric alcohols are preferably used as component B. These may be polyhydric alcohols such as, for example, polyhydric, branched symmetric and asymmetric alcohols, for example pentaerythritol and dipentaerythritol. In addition, carbohydrates such as oligosaccharides, in particular higher oligosaccharides, and polysaccharides, may also be used. Examples of these types of carbohydrates are cellulose and starch.

Pentaerythritol and dipentaerythritol are preferably used.

According to the invention, the phosphates and/or polyphosphates which may be used as component C, and which can react in particular with component B, are, for example, ammonium polyphosphates.

Water-soluble phosphates, for example ammonium phosphate, may also be used up to an amount of 10 wt. % to 50 wt. %, with respect to the powder composition.

Ammonium polyphosphate is preferably used.

According to the invention, chloroparaffins, melamine and/or melamine derivatives, e.g., melamine phosphate, melamine cyanurate, and dicyanodiamide are used as component D. They are used to form non-inflammable gases under the effects of heat. The use of melamine and melamine derivatives is particularly preferred.

Further binders may also optionally be present in the powder composition according to the invention in an amount of up to 15 wt. %, with respect to the composition. These may be, for example, further cross-linking resins such as acrylate resins, alkyd resins, acetate resins. Furthermore, dispersion powders such as vinyl acetate copolymers, vinyl acetate/vinyl ester copolymers, styrene acrylates, polyacrylates and styrobutadiene may be used. These are also used, inter alia, to improve the adhesion properties and the flexibility.

Optionally, liquid components A–D may also be used, in addition to powdered components A–D, provided they can be converted into the powder form by spray-drying prior to their use in the powder composition.

The powder composition according to the invention may optionally also contain expandable graphite, which expands under the effects of heat. This can be present, for example, in amounts of 0 wt. % to 5wt. %, with respect to the powder composition.

Further added substances such as additives are also possible, in addition to the components A–D mentioned. These may be wetting agents, for example Calgon, emulsifiers, plasticisers, thixotropic agents, for example silica, coloured pigments, for example titanium dioxide, film-forming auxiliary substances, defoamers, stabilisers, dedusting agents and other conventional additives.

Liquid additive components may be converted into the corresponding powder form by spray-drying.

A combination of the powder composition according to the invention and further added substances may also be used to prepare the coating composition. These types of added substances may be, for example, aluminium hydroxides and/or borates, e.g. zinc borate, and may be present in an amount of up to 10 wt. %, with respect to the composition.

The powder composition according to the invention may be prepared in equipment conventionally used to prepare powder mixtures. If required, these compositions may be milled to the desired particle size range in equipment conventionally used for this purpose.

The powder composition may be stored and transported in conventional vessels.

When required, i.e. immediately before application, the powder composition according to the invention is blended with water, with stirring. For example, a mixture of 40 to 80 wt. % of powder composition according to the invention and 60 to 20 wt. % of water may be used, preferably a mixture of 55 to 75 wt. % of powder composition according to the invention and 45 to 25 wt. % of water. Dispersant aids and/or other conventional additives may optionally also be used.

Application takes place using conventional processes and with conventional devices for coating, for example in a spray process or application with a brush or a roller.

The powder composition according to the invention may be applied to all conventional substrate surfaces as an aqueous dispersion. Metal, wood and plastics substrates, in particular also steel and concrete surfaces may be coated according to the invention.

The aqueous dispersion of powder composition according to the invention may be applied either directly to the untreated substrate surface or to the primed surface of the substrate. For example, the substrate surface may be provided with an anticorrosive paint before application of the coating composition.

The aqueous dispersion may be applied to the substrate in one or more layers.

The dry layer thickness of the coating is generally, for example, 200 μm to 10 mm. It depends substantially on the type and shape of the substrate. Hollow sections generally require thicker layers.

Drying or hardening of the coating may take place at room or ambient temperature or by increasing the temperature.

Further layers may be applied over the layer based on a powder composition according to the invention to protect the surface from environmental effects. This may be, for example, a suitable topcoat paint based on PVC/acrylates, wherein the topcoat layer may simultaneously be used to provide a coloured design or a clear layer may be applied.

As a result of the powder composition according to the invention, it is possible to obtain storage- and temperature-resistant compositions which can be processed in the freshly prepared condition, in a simple manner and without a substantial time requirement, to give ready-to-use, aqueous dispersions. The powder compositions are thus independent of the storage time and the effects of temperature, in particular the effects of frost. This is especially important because the single-component system is only stable in aqueous medium for a short period. In addition, the transport costs are greatly reduced due to smaller amounts transported, because the powder composition according to the invention is mixed with the required amount of water to prepare the aqueous dispersion only at the site of application. It is particularly surprising that, despite the use according to the invention of melamine resins as binders, coatings can be produced which ensure a high degree of flame-proofing and at the same time very good moisture- and frost-resistance and thus are suitable in particular for substrates which have to comply with the requirements of fire protection.

The invention is explained by means of the following examples:

EXAMPLE 1

Preparing a Powder Composition According to the Invention 20 parts by wt. of hexamethoxymethylmelamine, 20 parts by wt. of pentaerythritol, 10 parts by wt. of melamine, 40 parts by wt. of ammonium polyphosphate, 10 parts by wt. of additives/pigments are weighed out and mixed in a solids mixer with the formation of a dry powdery mixture.

EXAMPLE 2

Preparing a Powder Dispersion 100 parts by wt. of the powder mixture are stirred up with 25 parts by wt. of water to give a homogeneous dispersion over a period of about 3–4 minutes and then immediately applied to a steel surface provided with a primer paint.

What is claimed is:

1. A process for forming a coating on a substrate, which comprises
   1) applying a layer of an aqueous dispersion to said substrate and
   2) curing said layer to form said coating; wherein the aqueous dispersion comprises a powder composition dispersed in an aqueous medium in which the powder composition comprises components
      A) 15 to 30 wt. %, based on the weight of the powder composition, of a crosslinking agent comprising one or more melamine resins,
      B) 3 to 30 wt. %, based on the weight of the powder composition, of one or more polyhydric alcohols,
      C) 10 to 50 wt. %, based on the weight of the powder composition, of a phosphates compound selected from the group consisting of ammonium phosphate, ammonium polyphosphate and any mixtures thereof and
      D) 3 to 30 wt. %, based on the weigh of the powder composition, of a compound selected from the group consisting of chloroparaffins, melamine, melamine phosphates, melamine cyanurates, dicyanodiamide and any mixtures thereof;
   wherein the substrate is selected from the group consisting of plastics, concrete, steel and wood.

2. The process according to claim 1 wherein the melamine resin is a melamine/formaldehyde reaction product.

3. The process according to claim 1 wherein said polyhydric alcohol is pentaerythritol.

4. The process according to claim 1 wherein said polyhydric alcohol is dipentaerythritol.

5. A process according to claim 1, wherein component D is selected from the group consisting of melamine, melamine phosphates, melamine cyanurates, and any mixtures thereof.

6. The process according to claim 1 in which the powder composition further comprises up to 10 wt. %, based on the weight of the powder composition, of an additive selected from the group consisting of aluminum hydroxide, zinc borate and a mixture thereof.

7. The process according to claim 1 in which the powder composition further comprises up to 5wt. %, based on the weight of the powder composition, of expandable graphite.

8. The process according to claim 1 in which the aqueous dispersion comprises 40 to 80 wt. % of the powder composition and 20 to 60 wt. % of the aqueous medium.

9. A substrate coated according to the process of claim 1.

10. An aqueous dispersion comprising 40–80 wt. % of a powder composition dispersed in 20 to 60 wt. % of an aqueous medium in which the powder composition comprises components
- A) 15 to 30 wt. %, based on the weight of the powder composition, of a crosslinking agent comprising one or more melamine formaldehyde reaction products,
- B) 3 to 30 wt. %, based on the weight of the powder composition, of a polyhydric alcohol selected from the group consisting of pentaerythritol, dipentaerythritol and a mixture thereof,
- C) 10 to 50 wt. %, based on the weight of the powder composition, of a phosphate compound selected from the group consisting of ammonium phosphate, ammonium polyphosphate and any mixtures thereof, and
- D) 3 to 30 wt. %, based on the weight of the powder composition, of a compound selected from the group consisting of chloroparaffins, melamines, melamine phosphates, melamine cyanurates, dicyanodiamide and any mixtures thereof.

11. The composition according to claim 10 in which the powder composition comprises up to 10 wt. %, based on the weight of the powder composition, of an additive selected from the group consisting of aluminum hydroxide, zinc borate and a mixture thereof.

12. The composition according to claim 10 in which the powder composition comprises up to 5wt. %, based on the weight of the powder composition, of expandable graphite.

* * * * *